US012804118B2

(12) United States Patent
Nakamura et al.

(10) Patent No.: US 12,804,118 B2
(45) Date of Patent: Nov. 17, 2026

(54) IMAGE SENSING DEVICE, IMAGE SENSING METHOD, AND RECORDING MEDIUM

(71) Applicant: Nuvoton Technology Corporation Japan, Kyoto (JP)

(72) Inventors: Seiji Nakamura, Osaka (JP); Yoshinao Kawai, Kanagawa (JP); Kenji Nakamura, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 0 days.

(21) Appl. No.: 19/199,790

(22) Filed: May 6, 2025

(65) Prior Publication Data

US 2025/0267245 A1 Aug. 21, 2025

Related U.S. Application Data

(63) Continuation of application No. PCT/JP2023/039961, filed on Nov. 7, 2023.

(30) Foreign Application Priority Data

Nov. 15, 2022 (JP) ................................ 2022-182785

(51) Int. Cl.
*H04N 13/296* (2018.01)
*H04N 13/254* (2018.01)
(Continued)

(52) U.S. Cl.
CPC ......... *H04N 13/296* (2018.05); *H04N 13/254* (2018.05); *H04N 23/45* (2023.01); (Continued)

(58) Field of Classification Search
None
See application file for complete search history.

(56) References Cited

U.S. PATENT DOCUMENTS

2011/0157460 A1* 6/2011 Kim .................... H04N 23/651 348/372
2014/0062864 A1* 3/2014 Lee ........................ G06F 3/017 348/46
(Continued)

FOREIGN PATENT DOCUMENTS

JP 2020-187543 A 11/2020
WO 2020/075525 A1 4/2020
(Continued)

OTHER PUBLICATIONS

International Search Report (ISR) issued on Jan. 23, 2024 in International (PCT) Application No. PCT/JP2023/039961.

*Primary Examiner* — Christopher Braniff
(74) *Attorney, Agent, or Firm* — Rimon P.C.

(57) ABSTRACT

An image sensing device includes: a 2D camera that generates a 2D image; a 3D camera that includes a light source and generates a depth image based on reflected light of light emitted by the light source; and an image recognizer that performs recognition on a subject included in the 2D image, using at least one of the 2D image or the depth image; and a camera controller that controls on and off of an operation of the 3D camera. The camera controller turns on the operation of the 3D camera based on a result of the recognition using the 2D image when the 3D camera is in a standby state, and the 3D camera enters the standby state when the camera controller turns off the operation of the 3D camera after turning on the operation.

15 Claims, 8 Drawing Sheets

(51) Int. Cl.

| | |
|---|---|
| ***H04N 23/45*** | (2023.01) |
| ***H04N 23/61*** | (2023.01) |
| ***H04N 23/65*** | (2023.01) |
| ***H04N 23/67*** | (2023.01) |

(52) U.S. Cl.
CPC ........... *H04N 23/61* (2023.01); *H04N 23/651* (2023.01); *H04N 23/67* (2023.01)

(56) References Cited

U.S. PATENT DOCUMENTS

2020/0364444 A1 11/2020 Kanaoka et al.
2021/0341616 A1 11/2021 Saito et al.
2022/0172508 A1 6/2022 Suzuki et al.
2023/0003895 A1 1/2023 Kato et al.
2023/0161399 A1 5/2023 Shibayama et al.

FOREIGN PATENT DOCUMENTS

WO 2020/189266 A1 9/2020
WO 2021/199888 A1 10/2021

* cited by examiner

IMAGE SENSING DEVICE, IMAGE SENSING METHOD, AND RECORDING MEDIUM

CROSS REFERENCE TO RELATED APPLICATIONS

This is a continuation application of PCT International Patent Application No. PCT/JP2023/039961 filed on Nov. 7, 2023, designating the United States of America, which is based on and claims priority of Japanese Patent Application No. 2022-182785 filed on Nov. 15, 2022. The entire disclosures of the above-identified applications, including the specifications, drawings and claims are incorporated herein by reference in their entirety.

FIELD

The present disclosure relates to an image sensing device, an image sensing method, and a recording medium.

BACKGROUND

For example, Patent Literature (PTL) 1 discloses a device for personal authentication or determining the presence or absence of a person. In this device, a two-dimensional (2D) camera and a three-dimensional (3D) camera are both used. This makes it possible to prevent impersonation using a photograph and to detect only a target within a predetermined distance range.

CITATION LIST

Patent Literature

PTL 1: International Publication No. 2020/075525

SUMMARY

Technical Problem

However, since 3D cameras include a light emitting device (light source) for measuring a distance, when a 3D camera is used as in the device disclosed in PTL 1, power consumption increases with the light emission of the light source.

In view of the above, the present disclosure provides an image sensing device, etc. capable of achieving low power consumption while using both a 2D camera and a 3D camera.

Solution to Problem

An image sensing device according to the present disclosure includes: a two-dimensional (2D) camera that generates a 2D image; a three-dimensional (3D) camera that includes a light source and generates a depth image based on reflected light of light emitted by the light source; and an image recognizer that performs recognition on a subject included in the 2D image, using at least one of the 2D image or the depth image; and a camera controller that controls on and off of an operation of the 3D camera. In the above-described image sensing device, the camera controller turns on the operation of the 3D camera based on a result of the recognition using the 2D image, when the 3D camera is in a standby state in which the 3D camera has completed an initialization process after activation and the light source is not emitting light, and the 3D camera enters the standby state when the camera controller turns off the operation of the 3D camera after turning on the operation.

An image sensing method according to the present disclosure is an image sensing method performed by an image sensing device. The image sensing device includes: a two-dimensional (2D) camera that generates a 2D image; and a three-dimensional (3D) camera that includes a light source and generates a depth image based on reflected light of light emitted by the light source. The image sensing method includes: performing recognition on a subject included in the 2D image, using at least one of the 2D image or the depth image; and controlling on and off of an operation of the 3D camera. In the above-described image sensing method, in the controlling, the operation of the 3D camera is turned on based on a result of the recognition using the 2D image, when the 3D camera is in a standby state in which the 3D camera has completed an initialization process after activation and the light source is not emitting light, and the 3D camera enters the standby state when the operation of the 3D camera is turned off in the controlling after turned on in the controlling.

A recording medium according to the present disclosure is a non-transitory computer-readable recording medium having a program recorded thereon for causing a computer to execute the image sensing method described above.

Advantageous Effects

With the image sensing device, etc. according to one aspect of the present disclosure, it is possible to achieve low power consumption while using both a 2D camera and a 3D camera.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Hereinafter, embodiments will be described in detail with reference to the Drawings.

It should be noted that the embodiments described below each show a general or specific example. The numerical values, shapes, materials, structural components, the arrangement and connection of the structural components, steps, the processing order of the steps, and so on, indicated in the following embodiments are mere examples, and therefore do not limit the present disclosure.

Embodiment 1

The following describes an image sensing device according to Embodiment 1 with referenced to FIG. 1 through FIG. 5.

Figure 1:
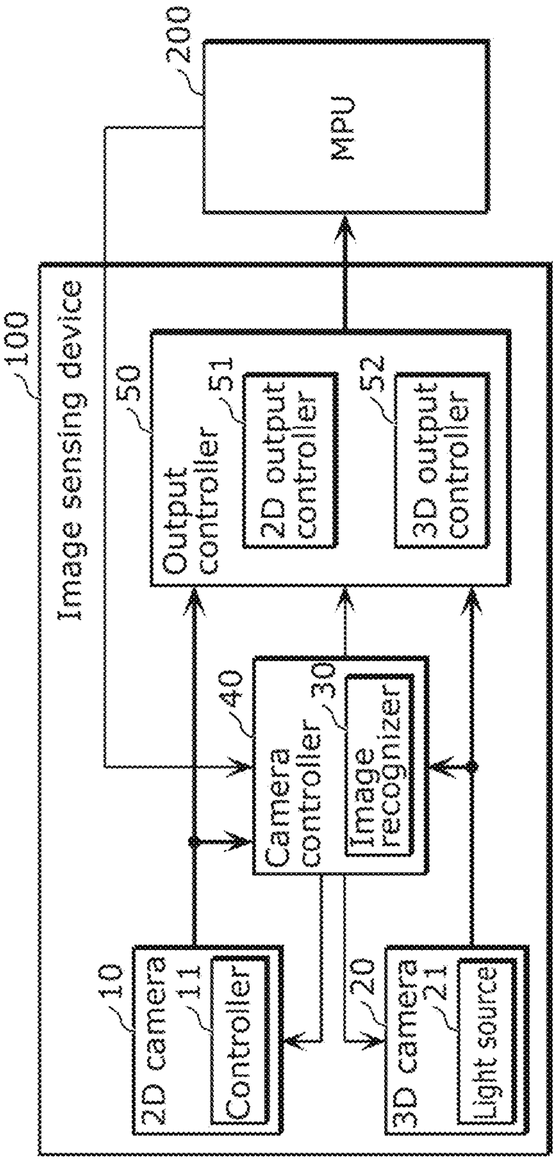
FIG. 1 is a block diagram illustrating an example of an image sensing device according to Embodiment 1.

FIG. 1 is a block diagram illustrating an example of image sensing device 100 according to Embodiment 1. FIG. 1 illustrates a micro processing unit (MPU) 200 that processes information that has been output from image sensing device 100. It should be noted that MPU 200 may be a structural component of image sensing device 100.

Image sensing device 100 is a device for performing recognition on a subject included in an image, and includes two-dimensional (2D) camera 10, three-dimensional (3D) camera 20, image recognizer 30, camera controller 40, 2D output controller 51, and 3D output controller 52. It should be noted that, although FIG. 1 illustrates image recognizer 30 as a structural component included by camera controller 40, image recognizer 30 need not necessarily be a structural component of camera controller 40. In addition, in FIG. 1, 2D output controller 51 and 3D output controller 52 are indicated collectively as output controller 50.

Image sensing device 100 is a computer that includes a processor, memory, etc. Memory is read only memory (ROM), random access memory (RAM), or the like, and is capable of storing programs executed by a processor. Image recognizer 30, camera controller 40, and output controller 50 are each implemented by a processor or the like that executes the program stored in the memory.

2D camera 10 is a camera that generates a two-dimensional (2D image). 2D camera 10 is, for example, a sensor such as an image sensor or an RGB sensor. It should be noted that the 2D image generated by 2D camera 10 may be a monochrome image.

For example, 2D camera 10 includes controller 11. Controller 11 is a processing unit that controls the focus and exposure of 2D camera 10. It should be noted that controller 11 need not necessarily be included in 2D camera 10. It is sufficient if controller 11 is included in image sensing device 100. For example, controller 11 controls the focus and exposure of 2D camera 10, based on a control signal from camera controller 40.

3D camera 20 is a camera that includes light source 21 and generates a depth image based on the reflected light of light emitted by light source 21. 3D camera 20 causes light source 21 to emit light at a predetermined timing (e.g., intermittent emission) when a signal for turning on its own operation is obtained, and generates a depth image from an exposed signal. When a signal for turning off its own operation is obtained, 3D camera 20 causes light source 21 to turn off emission and stops generating a depth image. In this case, the emission of light source 21 is constantly off. It should be noted that 3D camera 20 may cause light source 21 to emit light while a signal for turning on its own operation is obtained, and cause light source 21 to turn off emission when a signal for turning on its own operation is no longer obtained. 3D camera 20 is, for example, a camera that uses a time of flight (TOF) method or LiDAR (Light Detection And Ranging).

The power consumption of 3D camera 20 is high because light emission of light source 21 is necessary to generate the depth image. On the other hand, 2D camera 10 basically requires no light source, and thus the power consumption is low.

Image recognizer 30 performs recognition on a subject included in a 2D image, using the 2D image generated by 2D camera 10 or a depth image generated by 3D camera 20. For example, recognition is to identify whether a predetermined object is included in a 2D image. The predetermined object is a target of recognition, and is set as appropriate according to an application or the like. For example, when a human face is to be recognized using image sensing device 100, the predetermined object is a human face. For example, when a dog face is included in a 2D image, the result of recognition indicates that a human face is not included in the 2D image (it should be noted that it may be indicated that a dog face is included, depending on the performance of image recognizer 30), and when a human face is included in a 2D image, the result of recognition indicates that a human face is included in the 2D image. It should be noted that a predetermined object is not limited to a human face.

Camera controller 40 controls on and off of the operation of 3D camera 20. More specifically, when turning on the operation of 3D camera 20, camera controller 40 outputs, to 3D camera 20, a signal for turning on the operation of 3D camera 20, and when turning off the operation of 3D camera 20, camera controller 40 outputs, to 3D camera 20, a signal for turning off the operation of 3D camera 20. It should be noted that camera controller 40 may keep outputting a signal, to 3D camera 20, for turning on the operation of 3D camera 20 when the operation of 3D camera 20 is to be turned on, and may stop outputting the signal for turning on the operation of 3D camera 20 when the operation of 3D camera 20 is to be turned off. When 3D camera 20 is in the standby state, camera controller 40 turns on the operation of 3D camera 20 based on a result of recognition using a 2D image. The standby state of 3D camera 20 is the state in which 3D camera 20 has completed an initialization process after activation and light source 21 is not constantly emitting light. In other words, the standby state of 3D camera 20 is a state in which the power of 3D camera 20 is on but light source 21 is not constantly emitting light. 3D camera 20 enters the standby state when its operation is turned on by camera controller 40 and then turned off by camera controller 40. As described above, controlling on and off of the operation of 3D camera 20 is not intended to control on and off of the power of 3D camera 20.

For example, camera controller 40 turns on the operation of 3D camera 20 when 3D camera 20 is in the standby state and a result of recognition using a 2D image indicates that a predetermined object is included in the 2D image. In addition, when the operation of 3D camera 20 is on, camera controller 40 turns off the operation of 3D camera 20 based on a result of recognition using a 2D image. Specific examples of the operation of camera controller 40 will be described later.

2D output controller 51 controls the output of a 2D image, based on the result of recognition using a 2D image or a depth image. For example, 2D output controller 51 extracts, and outputs to MPU 200, a portion of the 2D image, based on a result of recognition.

3D output controller 52 controls the output of a depth image, based on the result of recognition using a 2D image or a depth image. For example, 3D output controller 52 extracts, and outputs to MPU 200, a portion of the depth image, based on the result of recognition.

Since a depth image of 3D camera 20 can be quite large data, there are problems of: a decrease in the processing speed of MPU 200 that performs analysis on a 2D image and a depth image or authentication using these images; and an increase in power consumption due to an increase in processing load. In view of this, for example, a control is performed such that a portion of the 2D image and depth image is output according to a result of image recognition, thereby making it possible to reduce the processing load on MPU 200. As a result, the processing speed of MPU 200 can be enhanced and the increase in power consumption due to the increase in processing load can be inhibited.

MPU 200 is an output destination of a 2D image and a depth image, and a processing unit that performs analysis on the 2D image and the depth image, or authentication, etc. using the 2D image and the depth image. For example, when a subject included in a 2D image is recognized as a human face, MPU 200 performs face authentication by identifying the individual differences of the face. It should be noted that the face recognition is an example, and the target of authentication performed by MPU 200 is not particularly limited.

Figure 2:
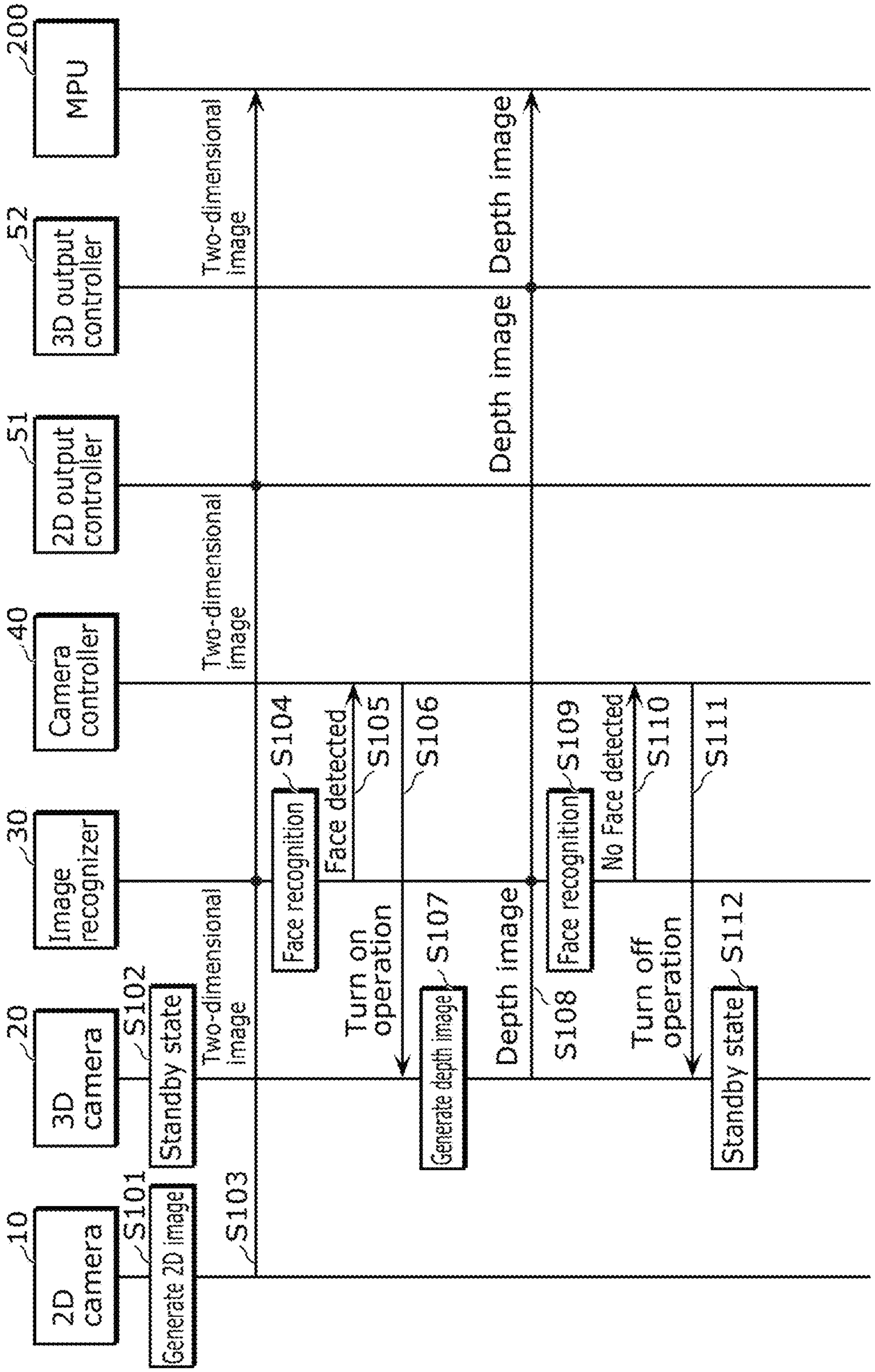
FIG. 2 is a sequence diagram illustrating a first example of an operation of the image sensing device according to Embodiment 1.
Figure 5:
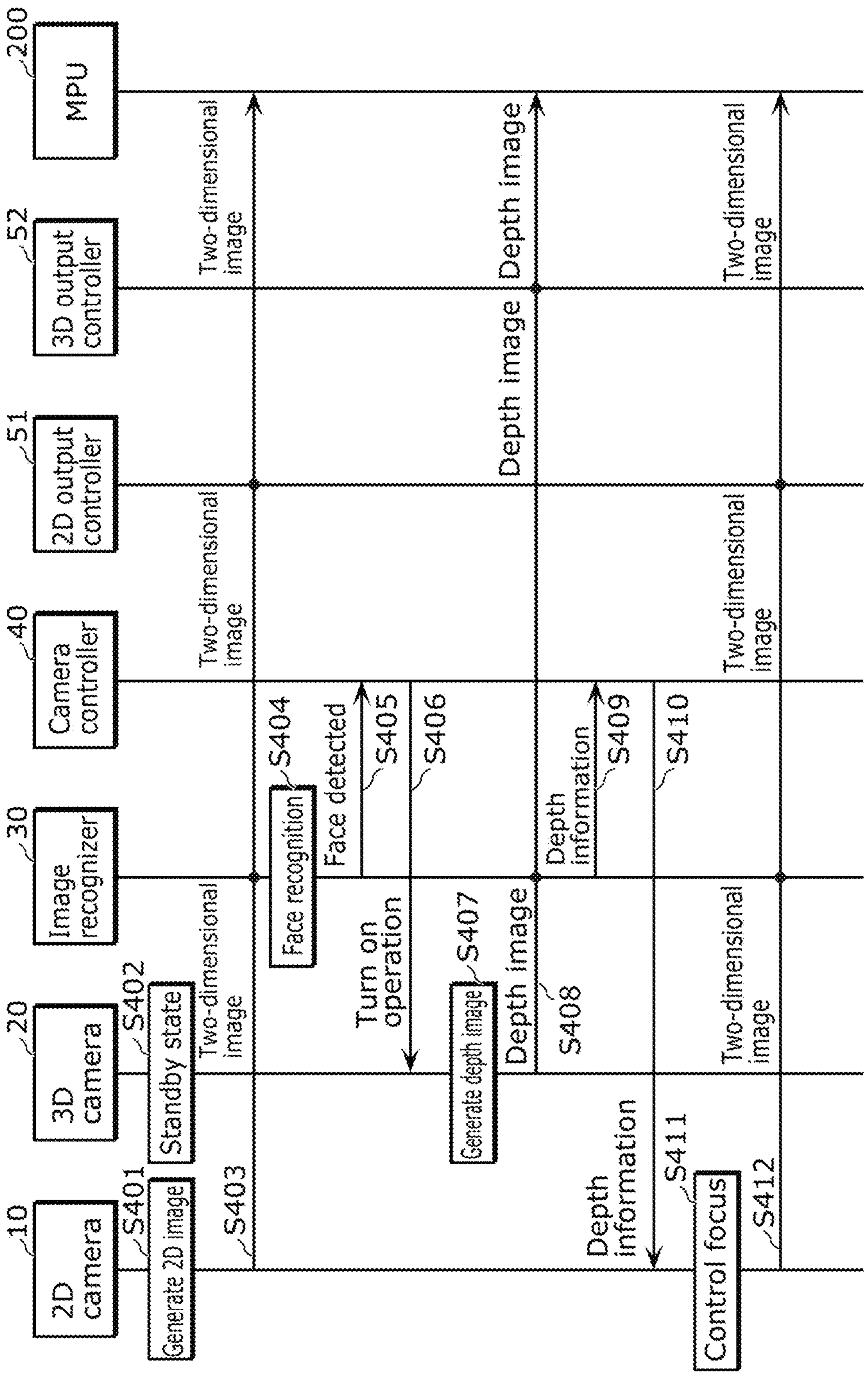
FIG. 5 is a sequence diagram illustrating a fourth example of the operation of the image sensing device according to Embodiment 1.

The following describes a specific example of the operation of image sensing device 100 with referenced to FIG. 2 and FIG. 5.

First, a first example of the operation of image sensing device 100 will be described with referenced to FIG. 2.

FIG. 2 is a sequence diagram illustrating the first example of the operation of image sensing device 100 according to Embodiment 1.

First, 2D camera 10 generates a 2D image of the surroundings (step S101).

At this time, 3D camera 20 is in a standby state and light source 21 is not emitting light (step S102).

2D camera 10 outputs the 2D image generated (step S103). For example, 2D camera 10 outputs the 2D image to image recognizer 30 and 2D output controller 51. 2D output controller 51 outputs the 2D image to MPU 200. In the first example, 2D output controller 51 outputs the 2D image to MPU 200 as it is. For example, MPU 200 outputs the 2D image to a display or the like.

Image recognizer 30 performs recognition on the subject included in the 2D image, using the 2D image. More specifically, image recognizer 30 performs face recognition for identifying whether a predetermined object (a human face, for example) is included in the 2D image (step S104). For example, when a person moves into the viewing angle of 2D camera 10, the result of recognition using the 2D image will indicate that a human face is included in the 2D image. For example, the predetermined object that is the target of recognition is set by MPU 200.

When a face is detected in the 2D image, image recognizer 30 notifies camera controller 40 that a face is detected (step S105).

Camera controller 40 turns on the operation of 3D camera 20 upon receiving the notification that a face is detected (step S106). For example, camera controller 40 outputs a signal, to 3D camera 20, for turning on the operation of 3D camera 20. As described above, camera controller 40 turns on the operation of 3D camera 20 when 3D camera 20 is in the standby state and a result of recognition using a 2D image indicates that a human face is included in a 2D image. In other words, camera controller 40 does not turn on the operation of 3D camera 20 (stated differently, does not cause light source 21 to emit light) until the target of recognition is included in the 2D image, and turns on the operation of 3D camera 20 when the target of recognition is included in the 2D image, thereby enabling 3D camera 20 to generate a depth image. In this manner, it is possible to cause 3D camera 20 to be in the standby state (i.e., emission of light source 21 is constantly off) until a human face that is the target of recognition is included in the 2D image. As a result, it is possible to achieve low power consumption.

3D camera 20 starts light emission and exposure upon receiving the signal for turning on the operation of 3D camera 20, and generates (step S107) and outputs (step S108) a depth image of the surroundings. For example, 3D camera 20 outputs the depth image to image recognizer 30 and 3D output controller 52. 3D output controller 52 also outputs the depth image to MPU 200. In the first example, 3D output controller 52 outputs the depth image to MPU 200 as it is. For example, MPU 200 performs face authentication, etc. using the 2D image and the depth image.

Image recognizer 30 performs recognition on the subject included in the 2D image, using the 2D image or the depth image. More specifically, image recognizer 30 performs face recognition for identifying whether a predetermined object (a human face, for example) is no longer included in the 2D image (step S109). For example, when a person moves out of the viewing angle of 2D camera 10, the result of recognition using the 2D image will indicate that a human face is not included in the 2D image.

When a face is not detected in the 2D image, image recognizer 30 notifies camera controller 40 that a face is no longer detected (step S110).

Camera controller 40 turns off the operation of 3D camera 20 upon receiving the notification indicating that a face is no longer detected (step S111). For example, camera controller 40 outputs a signal, to 3D camera 20, for turning off the operation of 3D camera 20. As described above, camera controller 40 turns off the operation of 3D camera 20 based on a result of recognition using a 2D image or a depth image when the operation of 3D camera 20 is on.

3D camera 20 then enters the standby state again (step S112). As described above, when a human face that is the target of recognition is no longer included in the 2D image after the operation of 3D camera 20 was turned on, it is possible to turn off the operation of 3D camera 20 (i.e., it is possible to cause 3D camera 20 to be in the standby state) because the target of recognition is no longer present. As a result, the light emission of light source 21 is also off constantly, thereby making it possible to reduce the power consumption of 3D camera 20.

Next, a second example of the operation of image sensing device 100 will be described with referenced to FIG. 3.

Figure 3:
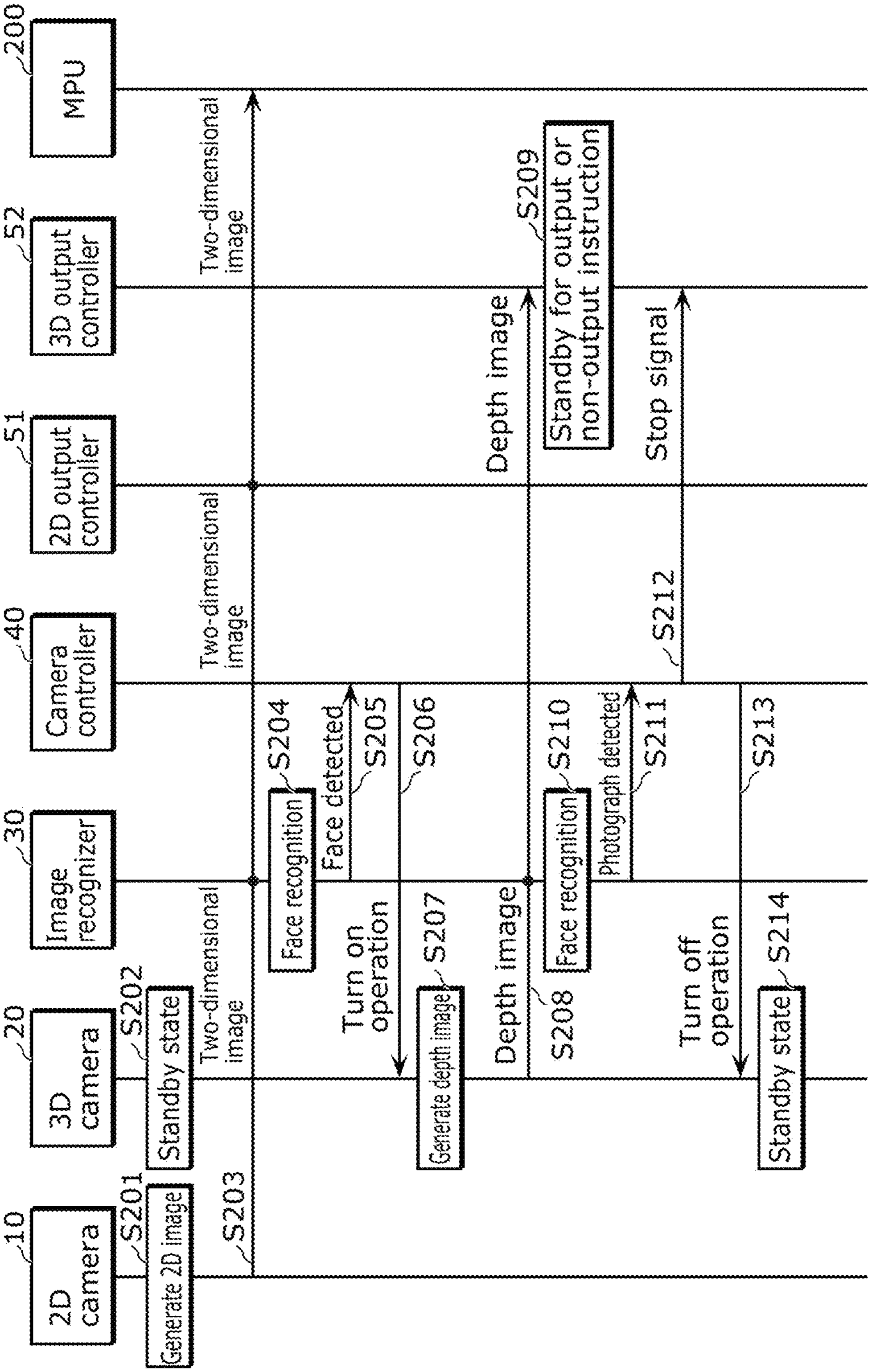
FIG. 3 is a sequence diagram illustrating a second example of the operation of the image sensing device according to Embodiment 1.

FIG. 3 is a sequence diagram illustrating the second example of the operation of image sensing device 100 according to Embodiment 1.

The processes from step S201 to step S207 illustrated in FIG. 3 are the same as the processes from step S101 to step S107 illustrated in FIG. 2, and therefore the explanation will be omitted.

3D camera 20 outputs the depth image generated (step S208). For example, 3D camera 20 outputs the depth image to image recognizer 30 and 3D output controller 52.

After obtaining the depth image, 3D output controller 52 stands by without outputting the depth image until a signal indicating whether the depth image can be output is obtained (step S209).

Image recognizer 30 performs recognition on the subject included in the 2D image, using the 2D image and the depth image. More specifically, image recognizer 30 performs face recognition for identifying whether a predetermined object appearing in an image (a human face, for example) is included in the 2D image (step S210). For example, when an image (e.g., a photograph) in which a human face is appearing is present in the viewing angle of 2D camera 10, a result of recognition using a 2D image and a depth image indicates that the human face appearing in the photograph is included in the 2D image. Since a photograph is flat but an actual human face has a depth, it is possible, by using a depth image, to identify whether a human face included in the 2D image is an actual human face or a human face appearing in the photograph.

When a photograph is detected in the 2D image, image recognizer 30 notifies camera controller 40 that a photograph is detected (step S211).

Camera controller 40 outputs an output stop signal to 3D output controller 52 upon receiving the notification that a photograph is detected (step S212). In this manner, 3D output controller 52 can discard the depth image obtained in step S208 so as not to output the depth image to MPU 200, and thus it is possible to reduce the processing load on MPU 200.

Camera controller 40 turns off the operation of 3D camera 20 upon receiving the notification that a photograph is detected (step S213). For example, camera controller 40 outputs a signal, to 3D camera 20, for turning off the operation of 3D camera 20. In this manner, camera controller 40 turns off the operation of 3D camera 20 when the operation of 3D camera 20 is on and the result of recognition using a 2D image and a depth image indicates that a human face appearing in a photograph is included in the 2D image.

3D camera 20 then enter the standby state again (step S214). As described above, after the operation of 3D camera 20 was turned on, if it turns out that the human face recognized is the human face appearing in the photograph, it is possible to turn off the operation of 3D camera 20 (i.e., it is possible to cause 3D camera 20 to be in the standby state) because the human face recognized is not an actual human face and thus not the target of recognition. As a result, the light emission of light source 21 is also off constantly, thereby making it possible to reduce the power consumption of 3D camera 20.

It should be noted that, when a photograph is not detected, the processes of step S109 and the subsequent processes described in the first example are performed.

Next, a third example of the operation of image sensing device 100 will be described with referenced to FIG. 4.

Figure 4:
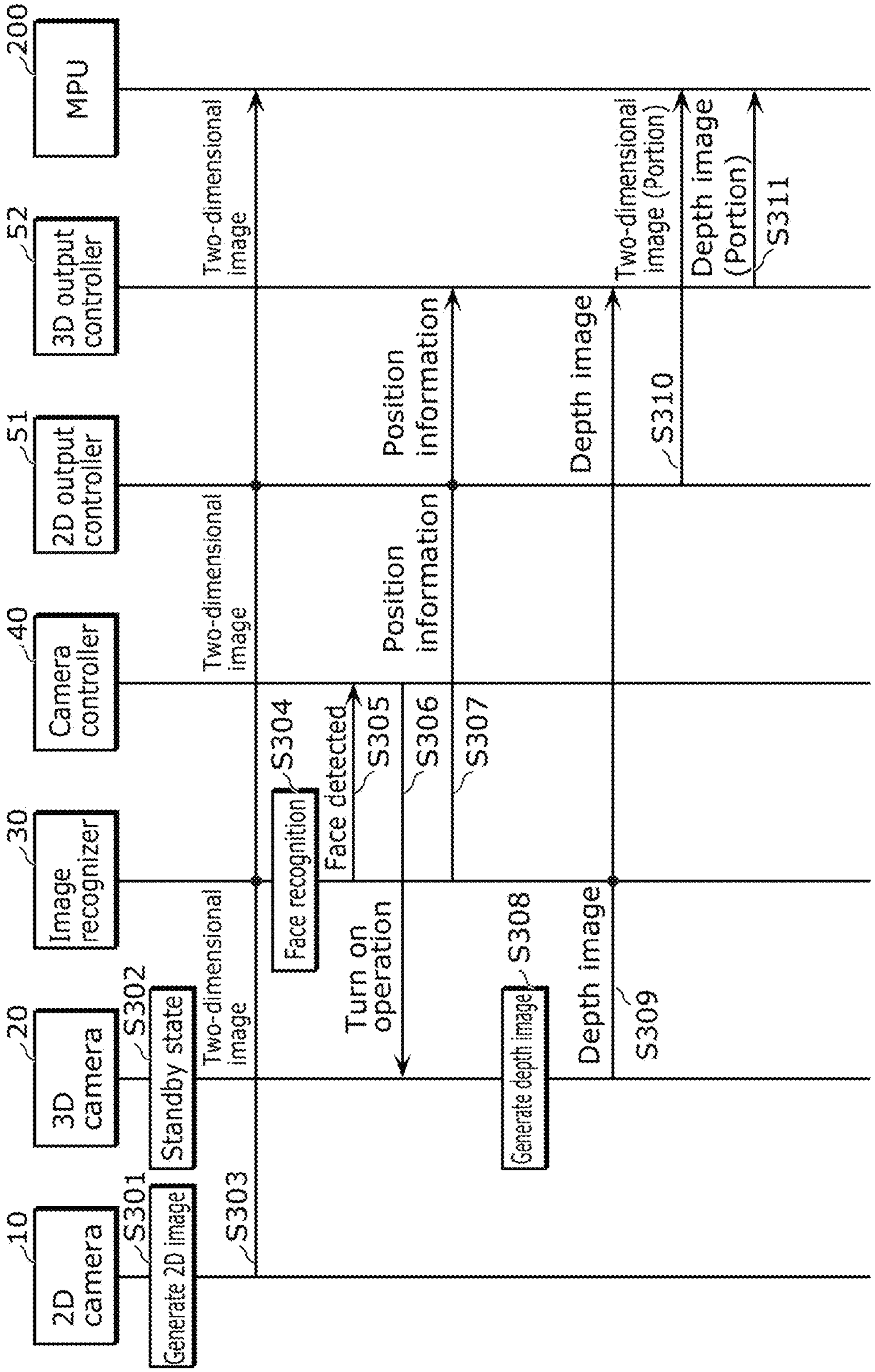
FIG. 4 is a sequence diagram illustrating a third example of the operation of the image sensing device according to Embodiment 1.

FIG. 4 is a sequence diagram illustrating the third example of the operation of image sensing device 100 according to Embodiment 1.

The processes from step S301 to step S306 illustrated in FIG. 4 are the same as the processes from step S101 to step S106 illustrated in FIG. 2, and therefore the explanation will be omitted. In the first example, it has been described that 2D output controller 51 outputs a 2D image to MPU 200 as it is. However, in the third example, 2D output controller 51 controls the output of a 2D image based on a result of recognition using the 2D image or a depth image.

When a predetermined object (e.g., a human face) is included in a 2D image, image recognizer 30 outputs, to 2D output controller 51 and 3D output controller 52, the position information of the portion in which the human face is included in the 2D image (step S307). For example, image recognizer 30 outputs, as the position information, the information indicating pixels corresponding to the region detected as a human face in the 2D image, to 2D output controller 51 and 3D output controller 52.

3D camera 20 starts light emission and exposure upon receiving the signal for turning on the operation of 3D camera 20, and generates (step S308) and outputs (step S309) a depth image of the surroundings. For example, 3D camera 20 outputs the depth image to image recognizer 30 and 3D output controller 52. In the first example, it has been described that 3D output controller 52 outputs a depth image to MPU 200 as it is. However, in the third example, 3D output controller 52 controls the output of a depth image based on a result of recognition using a 2D image or the depth image.

2D output controller 51 outputs, to MPU 200, the 2D image of the portion where the human face is included in the 2D image, based on the position information obtained (step S310). For example, 2D output controller 51 extracts, from the 2D image, the portion of the pixels corresponding to the region detected as a human face in the 2D image, and outputs the portion of the pixels in the 2D image to MPU 200.

3D output controller 52 outputs, to MPU 200, the depth image of the portion where the human face is included in the 2D image, based on the position information obtained (step S311). For example, 3D output controller 52 extracts, from the depth image, the portion of the pixels corresponding to the region detected as a human face in the 2D image, and outputs the portion of the pixels in the depth image to MPU 200.

In this manner, when the result of recognition using a 2D image or a depth image indicates that a predetermined object (e.g., a human face) is included in the 2D image, 2D output controller 51 outputs a 2D image of a portion where a human face is included in a 2D image, and 3D output controller 52 outputs a depth image of a portion where a human face is included in a 2D image. When a human face that is the target of recognition is included in a 2D image, it is possible to output only the 2D image of the portion where the human face is included (in other words, the 2D image from which the portion where the human face is not included is removed), and output only the depth image of the portion where the human face is included (in other words, the depth image from which the portion where the human face is not included is removed). As a result, it is possible to reduce the processing load on MPU 200.

When a plurality of faces are detected in step S304, or when a human face in a 2D image is at a distant location, there are cases where face authentication is wished to be carried out within a certain distance. In such cases, image recognizer 30 outputs the information of the pixels corresponding to the region within a predetermined distance range out of the region detected as a human face in the 2D image, to 2D output controller 51 and 3D output controller 52. In this manner, in step S310, 2D output controller 51 is capable of outputting, to MPU 200, the 2D image of the portion where the human face within the predetermined distance range in the 2D image is included. In addition, in step S311, 3D output controller 52 is capable of outputting, to MPU 200, the depth image of the portion where the human face within the predetermined distance range in the 2D image is included.

As described above, when the result of recognition using a 2D image and a depth image indicates that a human face is included in a predetermined distance range, 2D output controller 51 may output the 2D image of the portion where the human face is included in the 2D image, and 3D output controller 52 may output the depth image of the portion where the human face is included in the 2D image. When a human face that is the target of recognition is included in a 2D image and this human face is present within a predetermined distance range, only the 2D image of this portion can be output, and only the depth image of this portion can be output. As a result, it is possible to reduce the processing load on MPU 200.

It should be noted that, although illustration is omitted in FIG. 4, in the third example, the processes of step S109 and the subsequent processes are performed in the same manner as the first example, or the processes of step S209 and the subsequent processes are performed in the same manner as the second example.

Next, a fourth example of the operation of image sensing device 100 will be described with referenced to FIG. 5.

FIG. 5 is a sequence diagram illustrating the fourth example of the operation of image sensing device 100 according to Embodiment 1.

The processes from step S401 to step S408 illustrated in FIG. 5 are the same as the processes from step S101 to step S108 illustrated in FIG. 2, and therefore the explanation will be omitted.

Image recognizer 30 recognizes the depth to the human face included in the 2D image, based on the depth image, and outputs this depth information to camera controller 40 (step S409), and camera controller 40 outputs this depth information to 2D camera 10 (specifically, controller 11) (step S410).

2D camera 10 (controller 11) controls the focus of 2D camera 10 based on the depth information obtained (step S411), and outputs the 2D image obtained by 2D camera that has undergone focus control (step S412).

In this manner, controller 11 controls the focus of 2D camera 10 based on the depth information indicating the depth to the human face included in the 2D image indicated by the depth image. Since it is possible to control the focus of 2D camera 10 at high speed according to the depth from image sensing device 100 to the human face included in the 2D image, the human face included in the 2D image can be more easily brought into focus. As a result, it is possible to increase the accuracy of recognition or authentication using this 2D image.

Controller 11 may further control the exposure of 2D camera 10 based on the position information of the human face included in the 2D image.

It should be noted that, although illustration is omitted in FIG. 5, in the fourth example, the processes of step S109 and the subsequent processes are performed in the same manner as the first example, or the processes of step S209 and the subsequent processes are performed in the same manner as the second example.

As described above, it is possible to cause 3D camera 20 to be in the standby state until an intended result of recognition (detection of a human face, for example) is obtained by a 2D image generated by 2D camera 10. 3D camera 20 in the standby state is activated (in other words, the power is on) but only consumes approximately the same amount of power as the standby power because light source 21 is not emitting light, and thus the power consumption of 3D camera 20 is low. Accordingly, it is possible to suspend light emission of light source 21 of 3D camera 20 to reduce the power consumption until an intended result of recognition is obtained by a 2D image, and when an intended result of recognition is obtained, the operation of 3D camera 20 is turned on to cause light source 21 to emit light, thereby making it possible to perform detailed recognition. When the operation of 3D camera 20 is subsequently turned off, 3D camera 20 enters the standby state again, making it possible to reduce the power consumption of 3D camera 20. Accordingly, it is possible to achieve low power consumption while using both 2D camera 10 and 3D camera 20. In addition, in image sensing device 100, on and off of the operation of 3D camera 20 is controlled based on the result of recognition, but on and off of the power of 3D camera 20 is not controlled based on the result of recognition. As a result, it is possible to inhibit the initialization process from being performed every time the power of 3D camera 20 is repeatedly turned on and off, and thus a delay can be inhibited.

Embodiment 2

Figure 6:
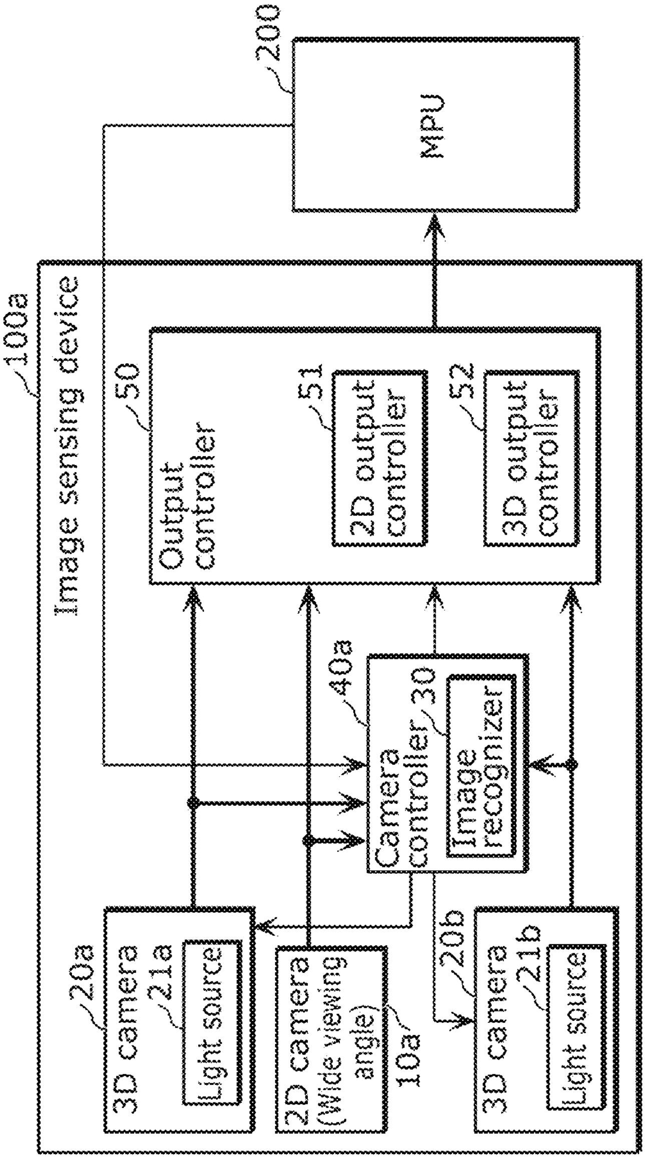
FIG. 6 is a block diagram illustrating an example of an image sensing device according to Embodiment 2.

The following describes an image sensing device according to Embodiment 2 with referenced to FIG. 6.

FIG. 6 is a block diagram illustrating an example of image sensing device 100*a* according to Embodiment 2. In FIG. 6, MPU 200 that processes information output from image sensing device 100*a* is illustrated. It should be noted that MPU 200 may be a structural component of image sensing device 100*a*.

Image sensing device 100*a* differs from image sensing device 100 according to Embodiment 1 in that image sensing device 100*a* includes 2D camera 10*a* in place of 2D camera 10, includes a plurality of 3D cameras in place of 3D camera 20, and includes camera controller 40*a* in place of camera controller 40. The other points are the same as those described in Embodiment 1, and thus the description will be omitted.

Since image sensing device 100*a* includes a plurality of 3D cameras, it is possible to perform sensing in a wider range compared to the case where a single 3D camera is included. For example, image sensing device 100*a* can be used for an obstacle detection process or the like that requires sensing in a wide range.

As illustrated in FIG. 6, image sensing device 100*a* includes 3D cameras 20*a* and 20*b*, for example, as the plurality of 3D cameras. 3D camera 20*a* includes light source 21*a* and generates a depth image based on the reflected light of light emitted by light source 21*a*. 3D camera 20*b* includes light source 21*b* and generates a depth image based on the reflected light of light emitted by light source 21*b*. It should be noted that image sensing device 100*a* may include three or more 3D cameras.

2D camera 10*a* is a camera that generates a 2D image. 2D camera 10*a* is a camera with a wide viewing angle, for example. Image sensing device 100*a* includes a plurality of 3D cameras, and accordingly 2D camera 10*a* is a camera with a wide viewing angle.

In addition to the functions of camera controller 40 according to Embodiment 1, camera controller 40*a* has a function of selecting at least one 3D camera from among a plurality of 3D cameras based on a position of a subject included in a 2D image when the plurality of 3D cameras are in a standby state, and turning on the operation of the at least one 3D camera selected, based on a result of recognition using the 2D image. For example, when image recognizer 30 identifies that a subject included in a 2D image is present in a viewing angle, camera controller 40*a* selects 3D camera 20*a* out of 3D cameras 20*a* and 20*b*. Camera controller 40*a* then turns on the operation of 3D camera 20*a* selected when, for example, the subject included in the 2D image is a predetermined object (a human face, for example).

In this manner, out of 3D cameras 20*a* and 20*b*, the operation of only 3D camera 20*a* that is capable of generating a depth image at the position of the subject included in a 2D image is turned on, thereby achieving lower power consumption than the case where all of the operations of 3D cameras 20*a* and 20*b* are turned on. In addition, since it is possible to avoid outputting, to MPU 200, the depth images from both of 3D cameras 20*a* and 20*b*, it is possible to reduce the processing load on MPU 200. Accordingly, it is possible to improve the processing speed of MPU 200, and to inhibit an increase in power consumption due to the increase of processing load.

It should be noted that image sensing device 100*a* according to Embodiment 2 may also have the functions of image sensing device 100 described in the first example through the fourth example according to Embodiment 1.

Embodiment 3

Figure 7:
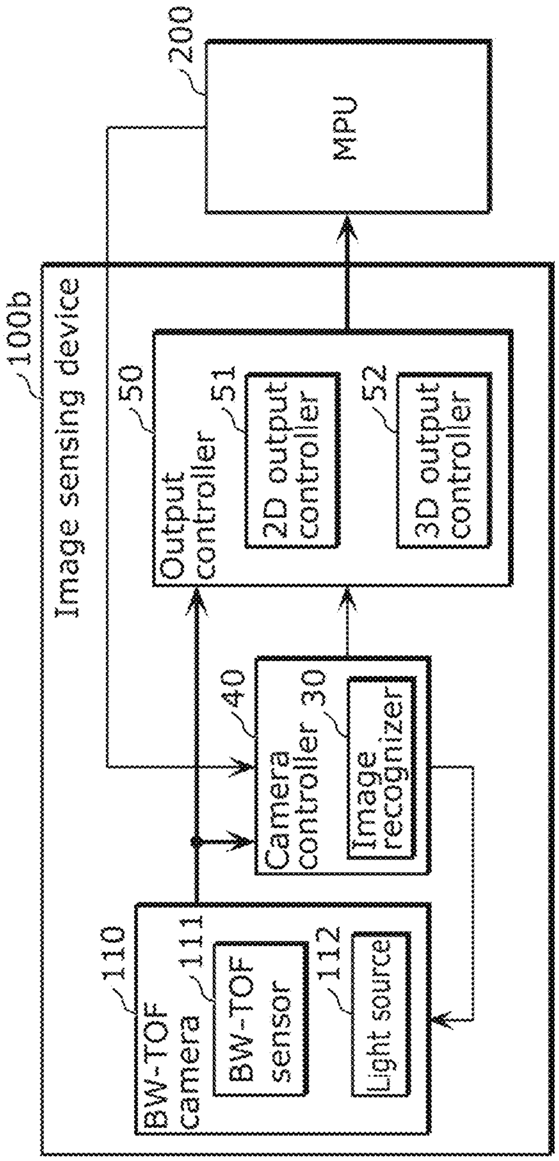
FIG. 7 is a block diagram illustrating an example of an image sensing device according to Embodiment 3.

The following describes an image sensing device according to Embodiment 3 with referenced to FIG. 7.

FIG. 7 is a block diagram illustrating an example of image sensing device 100*b* according to Embodiment 3. In FIG. 7, MPU 200 that processes information output from image sensing device 100*b* is illustrated. It should be noted that MPU 200 may be a structural component of image sensing device 100*b*.

Image sensing device 100*b* differs from image sensing device 100 according to Embodiment 1 in that BW-TOF camera 110 is included in place of 2D camera 10 and 3D camera 20. The other points are the same as those described in Embodiment 1, and thus the description will be omitted.

BW-TOF camera 110 is a camera in which a 2D camera and a 3D camera are integrally provided. In other words, BW-TOF camera 110 is a camera having the functions of both the 2D camera and the 3D camera.

BW-TOF camera 110 includes BW-TOF sensor 111 and light source 112. BW-TOF sensor 111 includes a pixel (IR pixel) for generating a depth image and a pixel (BW pixel) for generating a 2D image (monochrome image), and is capable of generating a 2D image when light source 112 is not emitting light and generating both a depth image and a 2D image using reflected light of light emitted by light source 112.

Here, BW-TOF camera 110 is described as an example of the camera in which a 2D camera and a 3D camera are integrally provided. However, the camera is not particularly limited as long as it is a camera in which a 2D camera and a 3D camera are integrally provided, in other words, a camera having the functions of both the 2D camera and 3D camera. For example, the camera in which a 2D camera and a 3D camera are integrally provided may be an RGB-TOF camera. The RGB-TOF camera, in contrast to BW-TOF camera 110, is a camera capable of obtaining a color image instead of a monochrome image.

As described above, it is possible to achieve low power consumption while using both a 2D camera and a 3D camera, even in the case where the 2D camera and the 3D camera are integrally provided. In addition, the 2D camera and the 3D camera are integrally provided, and thus it is possible to downsize image sensing device 100*b*.

It should be noted that image sensing device 100*b* according to Embodiment 3 may also have the functions of image sensing device 100 described in the first example through the fourth example according to Embodiment 1.

OTHER EMBODIMENTS

Although the image sensing device according to one or more aspects of the present disclosure has been described above based on the embodiment, the present disclosure is not limited to the above-described embodiment. Other forms in which various modifications apparent to those skilled in the art are applied to the embodiments, or forms structured by combining structural components of different embodiments may be included within the scope of one or more aspects of the present disclosure, unless such changes and modifications depart from the scope of the present disclosure.

For example, although the foregoing embodiment has described an example in which the camera controller turns off the operation of the 3D camera based on a result of recognition using a 2D image or a depth image when the operation of the 3D camera is on, the present disclosure is not limited to this example. For example, the camera controller may turn off the operation of the 3D camera based on the result of an input from an external device when the operation of the 3D camera is on.

For example, the external device is a device that performs authentication on a subject included in a 2D image based on a result of recognition using the 2D image or a depth image, and is specifically, an MPU, etc. When the authentication process has been completed, the MPU outputs, to the image sensing device, a signal indicating that the authentication process has been completed. In this case, when the result of input from the MPU to the image sensing device indicates that the authentication process has been completed, no further recognition on the subject included in the 2D image is necessary, and thus it is possible to turn off the operation of the 3D camera. As a result, it is possible to reduce the power consumption of the 3D camera.

For example, although the embodiment described above has described an example in which the image sensing device includes a 2D output controller that controls output of a 2D image and a 3D output controller that controls output of a depth image, the image sensing device need not necessarily include the 2D output controller and the 3D output controller.

For example, although the embodiment described above has described an example in which the image sensing device includes a controller that controls the focus of the 2D camera, the image sensing device need not necessarily include such a controller.

For example, the present disclosure can be implemented not only as an image sensing device but also as an image sensing method that includes steps (processes) performed by the structural components that constitute the image sensing device.

Figure 8:
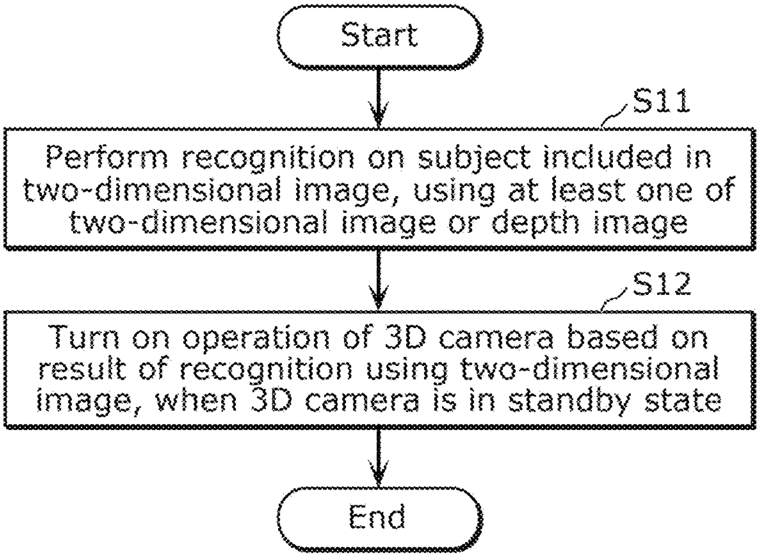
FIG. 8 is a flowchart illustrating an example of an image sensing method according to another embodiment.

FIG. 8 is a flowchart illustrating another example of the image sensing method according to other embodiments.

An image sensing method is a method executed by an image sensing device. The image sensing device includes a 2D camera that generates a 2D image and a 3D camera that includes a light source and generates a depth image based on the reflected light of light emitted by the light source. The image sensing method includes, as illustrated in FIG. 8, an image recognition step (step S11) that performs recognition on a subject included in a 2D image, using the 2D image or a depth image, and a camera controlling step that controls on and off of the operation of the 3D camera. In the camera controlling step, when the 3D camera is in a in the standby state in which the 3D camera has completed the initialization process after activation and the light source is not emitting light, the operation of the 3D camera is turned on based on a result of recognition using the 2D image (step S12), and the 3D camera enters the standby state when the operation is turned off in the camera controlling step after turned on in the cameral controlling step.

For example, the present disclosure can be implemented as a program for causing a computer (processor) to execute the steps included in the image sensing method. In addition, the present disclosure can be implemented as a non-transitory computer-readable recording medium such as a compact disc-read only memory (CD-ROM) including the program recorded thereon.

For example, when the present disclosure is implemented by a program (software), each of the steps is performed as a result of the program being executed by utilizing hardware resources such as a CPU, memory, an input and output circuit, etc. of a computer. In other words, each step is executed by the CPU obtaining data from memory or an input and output circuit, etc., performing calculations, and outputting calculation results to memory or input and output circuit, etc.

It should be noted that, in the foregoing embodiments, each of the structural components included in the image sensing device may be configured as dedicated hardware, or may be implemented by executing a software program suitable for the structural component. Each of the structural components may be realized by means of a program executing unit, such as a CPU or a processor, reading and executing the software program recorded on a recording medium such as a hard disk or a semiconductor memory.

Some or all of the functions of the image sensing device according to the foregoing embodiments are typically implemented as LSIs which are integrated circuits. They may be implemented as a single chip one-by-one, or as a single chip to include some or all thereof. In addition, the integrated circuit is not limited to an LSI, and it may be implemented as a dedicated circuit or a general-purpose processor. A field programmable gate array (FPGA) that is programmable after an LSI is manufactured or a reconfigurable processor that is capable of reconfiguring connection and settings of circuit cells inside an LSI may be employed.

(Others)

The descriptions of the embodiments described above disclose the following techniques.

(Technique 1) An image sensing device that includes: a two-dimensional (2D) camera that generates a 2D image; a three-dimensional (3D) camera that includes a light source and generates a depth image based on reflected light of light emitted by the light source; and an image recognizer that performs recognition on a subject included in the 2D image, using at least one of the 2D image or the depth image; and a camera controller that controls on and off of an operation of the 3D camera. In the above-described image sensing device, the camera controller turns on the operation of the 3D camera based on a result of the recognition using the 2D image, when the 3D camera is in a standby state in which the 3D camera has completed an initialization process after activation and the light source is not emitting light, and the 3D camera enters the standby state when the camera controller turns off the operation of the 3D camera after turning on the operation.

With this configuration, it is possible to cause the 3D camera to be in the standby state until an intended result of recognition is obtained by a two-dimensional image generated by the 2D camera. The 3D camera in the standby state is activated (in other words, the power is on) but only consumes approximately the same amount of power as the standby power because the light source is not emitting light, and thus the power consumption of the 3D camera is low. As a result, it is possible to suspend light emission of the light source of the 3D camera to reduce the power consumption until an intended result of recognition is obtained by a two-dimensional image, and when an intended result of recognition is obtained, the operation of the 3D camera is turned on to cause the light source of the 3D camera to emit light, thereby making it possible to perform detailed recognition. When the operation of the 3D camera is subsequently turned off, the 3D camera enters the standby state again, making it possible to reduce the power consumption of the 3D camera. It is thus possible to achieve low power consumption while using both the 2D camera and the 3D camera. In addition, in the image sensing device, on and off of the operation of the 3D camera is controlled based on the result of recognition, but on and off of the power of the 3D camera is not controlled based on the result of recognition. As a result, it is possible to inhibit the initialization process from being performed every time the power of the 3D camera is repeatedly turned on and off, and thus a delay can be inhibited.

(Technique 2) The image sensing device according to Technique 1, in which the camera controller turns on the operation of the 3D camera when the 3D camera is in the standby state and the result of the recognition using the 2D image indicates that a predetermined object is included in the 2D image.

In this manner, it is possible to cause the 3D camera to be in the standby state until a predetermined object that is the target of recognition is included in the two-dimensional image. As a result, it is possible to achieve low power consumption.

(Technique 3) The image sensing device according to Technique 1 or 2, in which the camera controller turns off the operation of the 3D camera based on a result of the recognition using the at least one of the 2D image or the depth image, when the operation of the 3D camera is on.

In this manner, it is possible to turn off the operation of the 3D camera based on a result of some sort of recognition using a two-dimensional image or a depth image, and the light emission of the light source is constantly off accordingly. As a result, it is possible to reduce the power consumption of the 3D camera.

(Technique 4) The image sensing device according to Technique 3, in which the camera controller turns off the operation of the 3D camera when the operation of the 3D camera is on and the result of the recognition using the at least one of the 2D image or the depth image indicates that a predetermined object is not included in the 2D image.

For example, when a predetermined object that is the target of recognition is no longer included in the two-dimensional image after the operation of the 3D camera is turned on, it is possible to turn off the operation of the 3D camera because the target of recognition is no longer present. As a result, light emission of the light source is also off constantly, thereby making it possible to reduce the power consumption of the 3D camera.

(Technique 5) The image sensing device according to Technique 3 or 4, in which the camera controller turns off the operation of the 3D camera when the operation of the 3D camera is on and a result of the recognition using the 2D image and the depth image indicates that a predetermined object appearing in an image is included in the 2D image.

For example, after the operation of the 3D camera was turned on, if it turns out that the object recognized is an object appearing in an image, it is possible to turn off the operation of the 3D camera because the object recognized is not an actual object and thus not the target of recognition. As a result, the light emission of the light source is also off constantly, thereby making it possible to reduce the power consumption of the 3D camera.

(Technique 6) The image sensing device according to any one of Techniques 1 to 5, in which the camera controller turns off the operation of the 3D camera based on a result of an input from an external device when the operation of the 3D camera is on.

For example, the external device is a device that performs authentication on a subject included in the two-dimensional image, based on a result of recognition using a two-dimensional image or a depth image. When the authentication process has been completed, the external device outputs, to the image sensing device, a signal indicating that the authentication process has been completed. In this case, when the result of input from the external device to the image sensing device indicates that the authentication process has been completed, no further recognition on the subject included in the 2D image is necessary, and thus it is possible to turn off the operation of the 3D camera. As a result, it is possible to reduce the power consumption of the 3D camera.

(Technique 7) The image sensing device according to any one of Techniques 1 to 6 further includes: a 2D output controller that controls an output of the 2D image, based on a result of the recognition using the at least one of the 2D image or the depth image; and a 3D output controller that controls an output of the depth image, based on the result of the recognition using the at least one of the 2D image or the depth image.

Since a depth image of the 3D camera can be quite large data, there are problems of: a decrease in the processing speed of the device that is the output destination of a two-dimensional image and a depth image and performs analysis on the 2D image and the depth image or authentication using these images; and an increase in power consumption due to an increase in processing load. In view of this, for example, a control is performed such that a portion of the 2D image and depth image is output according to a result of image recognition, thereby making it possible to reduce the processing load on the device that is the output destination. As a result, the processing speed of the device that is the output destination can be enhanced and the increase in power consumption due to the increased processing load can be suppressed.

(Technique 8) The image sensing device according to Technique 7, in which when the result of the recognition using the at least one of the 2D image or the depth image indicates that a predetermined object is included in the 2D image, the 2D output controller outputs a 2D image of a portion including the predetermined object in the 2D image, and the 3D output controller outputs a depth image of the portion including the predetermined object in the 2D image.

When a predetermined object that is the target of recognition is included in a 2D image, it is possible to output only the 2D image of the portion where this object is included (in other words, the 2D image from which the portion where the object is not included is removed), and output only the depth image of the portion where this object is included (in other words, the depth image from which the portion where the object is not included is removed). As a result, it is possible to reduce the processing load on the device that is the output destination.

(Technique 9) The image sensing device according to Technique 7, in which when a result of the recognition using the 2D image and the depth image indicates that a predetermined object is included within a predetermined distance range, the 2D output controller outputs a 2D image of a portion including the predetermined object in the 2D image, and the 3D output controller outputs a depth image of the portion including the predetermined object in the 2D image.

When a predetermined object that is the target of recognition is included in a two-dimensional image and this object is present within a predetermined distance range, only the two-dimensional image of the portion where this object is included can be output, and only the depth image of the portion where this object is included can be output. As a result, it is possible to reduce the processing load on the device that is the output destination.

(Technique 10) The image sensing device according to any one of Techniques 1 to 9 further includes: a controller that controls a focus of the 2D camera based on depth information that is indicated by the depth image and indicates a depth to the subject included in the 2D image.

With this configuration, since it is possible to control the focus of the 2D camera at high speed according to the depth from the image sensing device to the subject included in the 2D image, the subject included in the 2D image can be more easily brought into focus. As a result, it is possible to increase the accuracy of recognition or authentication using this 2D image.

(Technique 11) The image sensing device according to any one of Techniques 1 to 10, in which the image sensing device includes a plurality of 3D cameras each being the 3D camera, and the camera controller, when the plurality of 3D cameras are in the standby state, selects at least one of the plurality of 3D cameras based on a position of the subject included in the 2D image, and turns on an operation of the at least one of the plurality of 3D cameras selected, based on the result of the recognition using the 2D image.

For example, the image sensing device may be a device capable of performing sensing in a wide range, using a plurality of 3D cameras. In this case, the operation of only the 3D camera that is capable of generating a depth image at the position of the subject included in a two-dimensional image is turned on, thereby achieving lower power consumption than the case where a plurality of 3D cameras are turned on. In addition, since it is possible to avoid outputting the depth images from all of the plurality of 3D cameras to the device that is the output destination, it is possible to reduce the processing load on the device that is the output destination. As a result, the processing speed of the device that is the output destination can be enhanced and the increase in power consumption due to the increased processing load can be suppressed.

(Technique 12) The image sensing device according to any one of Techniques 1 to 11, in which the 2D camera and the 3D camera are integrally provided.

As described above, the 2D camera and the 3D camera are integrally provided, and thus it is possible to downsize the image sensing device.

(Technique 13) An image sensing method performed by an image sensing device. The image sensing device includes: a two-dimensional (2D) camera that generates a 2D image; and a three-dimensional (3D) camera that includes a light source and generates a depth image based on reflected light of light emitted by the light source. The image sensing method includes: performing recognition on a subject included in the 2D image, using at least one of the 2D image or the depth image; and controlling on and off of an operation of the 3D camera. In the above-described image sensing method, in the controlling, the operation of the 3D camera is turned on based on a result of the recognition using the 2D image, when the 3D camera is in a standby state in which the 3D camera has completed an initialization process after activation and the light source is not emitting light, and the 3D camera enters the standby state when the operation of the 3D camera is turned off in the controlling after turned on in the controlling.

In this manner, it is possible to provide an image sensing method capable of achieving low power consumption while using both the 2D camera and the 3D camera.

(Technique 14) A program for causing a computer to execute the image sensing method according to Technique 13.

In this manner, it is possible to provide a program that enables achieving low power consumption while using both the 2D camera and the 3D camera.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable, for example, to devices that perform image recognition using both a 2D camera and a 3D camera.

The invention claimed is:

1. An image sensing device comprising:
- a two-dimensional (2D) camera that generates a 2D image;
- a three-dimensional (3D) camera that includes a light source and generates a depth image based on reflected light of light emitted by the light source;
- an image recognizer that performs recognition on a subject included in the 2D image, using at least one of the 2D image or the depth image; and
- a camera controller that controls on and off of an operation of the 3D camera, wherein
- the camera controller turns on the operation of the 3D camera based on a result of the recognition using the 2D image, when the 3D camera is in a standby state in which the 3D camera has completed an initialization process after activation and the light source is not emitting light,
- the 3D camera enters the standby state when the camera controller turns off the operation of the 3D camera after turning on the operation, and
- the camera controller turns off the operation of the 3D camera when the operation of the 3D camera is on and the result of the recognition using the at least one of the 2D image or the depth image indicates that a predetermined object is not included in the 2D image.

2. The image sensing device according to claim 1, wherein
- the camera controller turns on the operation of the 3D camera when the 3D camera is in the standby state and the result of the recognition using the 2D image indicates that a predetermined object is included in the 2D image.

3. The image sensing device according to claim 1, wherein
- the camera controller turns off the operation of the 3D camera when the operation of the 3D camera is on and a result of the recognition using the 2D image and the depth image indicates that a predetermined object appearing in an image is included in the 2D image.

4. The image sensing device according to claim 1, wherein
- the camera controller turns off the operation of the 3D camera based on a result of an input from an external device when the operation of the 3D camera is on.

5. The image sensing device according to claim 1, further comprising:
- a 2D output controller that controls an output of the 2D image, based on a result of the recognition using the at least one of the 2D image or the depth image; and
- a 3D output controller that controls an output of the depth image, based on the result of the recognition using the at least one of the 2D image or the depth image.

6. The image sensing device according to claim 5, wherein
- when the result of the recognition using the at least one of the 2D image or the depth image indicates that a predetermined object is included in the 2D image,
- the 2D output controller outputs a 2D image of a portion including the predetermined object in the 2D image, and
- the 3D output controller outputs a depth image of the portion including the predetermined object in the 2D image.

7. The image sensing device according to claim 1, wherein
- the 2D camera and the 3D camera are integrally provided.

8. An image sensing device comprising:
- a two-dimensional (2D) camera that generates a 2D image;
- a three-dimensional (3D) camera that includes a light source and generates a depth image based on reflected light of light emitted by the light source;
- an image recognizer that performs recognition on a subject included in the 2D image, using at least one of the 2D image or the depth image; and
- a camera controller that controls on and off of an operation of the 3D camera, wherein
- the camera controller turns on the operation of the 3D camera based on a result of the recognition using the 2D image, when the 3D camera is in a standby state in which the 3D camera has completed an initialization process after activation and the light source is not emitting light,
- the 3D camera enters the standby state when the camera controller turns off the operation of the 3D camera after turning on the operation,
- the image sensing device further comprises:
  - a 2D output controller that controls an output of the 2D image, based on a result of the recognition using the at least one of the 2D image or the depth image; and
  - a 3D output controller that controls an output of the depth image, based on the result of the recognition using the at least one of the 2D image or the depth image, and
- when a result of the recognition using the 2D image and the depth image indicates that a predetermined object is included within a predetermined distance range,
  - the 2D output controller outputs a 2D image of a portion including the predetermined object in the 2D image, and
  - the 3D output controller outputs a depth image of the portion including the predetermined object in the 2D image.

9. An image sensing device comprising:

a two-dimensional (2D) camera that generates a 2D image;

a three-dimensional (3D) camera that includes a light source and generates a depth image based on reflected light of light emitted by the light source;

an image recognizer that performs recognition on a subject included in the 2D image, using at least one of the 2D image or the depth image; and a camera controller that controls on and off of an operation of the 3D camera, wherein the camera controller turns on the operation of the 3D camera based on a result of the recognition using the 2D image, when the 3D camera is in a standby state in which the 3D camera has completed an initialization process after activation and the light source is not emitting light, the 3D camera enters the standby state when the camera controller turns off the operation of the 3D camera after turning on the operation, and the image sensing device further comprises:

a controller that controls a focus of the 2D camera based on depth information that is indicated by the depth image and indicates a depth to the subject included in the 2D image.

10. An image sensing device comprising:

a two-dimensional (2D) camera that generates a 2D image;

a three-dimensional (3D) camera that includes a light source and generates a depth image based on reflected light of light emitted by the light source;

an image recognizer that performs recognition on a subject included in the 2D image, using at least one of the 2D image or the depth image; and a camera controller that controls on and off of an operation of the 3D camera, wherein the camera controller turns on the operation of the 3D camera based on a result of the recognition using the 2D image, when the 3D camera is in a standby state in which the 3D camera has completed an initialization process after activation and the light source is not emitting light, the 3D camera enters the standby state when the camera controller turns off the operation of the 3D camera after turning on the operation, the image sensing device includes a plurality of 3D cameras each being the 3D camera, and the camera controller, when the plurality of 3D cameras are in the standby state, selects at least one of the plurality of 3D cameras based on a position of the subject included in the 2D image, and turns on an operation of the at least one of the plurality of 3D cameras selected, based on the result of the recognition using the 2D image.

11. An image sensing method performed by an image sensing device, the image sensing device including: a two-dimensional (2D) camera that generates a 2D image; and a three-dimensional (3D) camera that includes a light source and generates a depth image based on reflected light of light emitted by the light source, the image sensing method comprising:

performing recognition on a subject included in the 2D image, using at least one of the 2D image or the depth image; and controlling on and off of an operation of the 3D camera, wherein in the controlling, the operation of the 3D camera is turned on based on a result of the recognition using the 2D image, when the 3D camera is in a standby state in which the 3D camera has completed an initialization process after activation and the light source is not emitting light, the 3D camera enters the standby state when the operation of the 3D camera is turned off in the controlling after being turned on in the controlling, and in the controlling, the operation of the 3D camera is turned off when the operation of the 3D camera is on and the result of the recognition using the at least one of the 2D image or the depth image indicates that a predetermined object is not included in the 2D image.

12. A non-transitory computer-readable recording medium having a program recorded thereon for causing a computer to execute the image sensing method according to claim 11.

13. An image sensing method performed by an image sensing device, the image sensing device including:

a two-dimensional (2D) camera that generates a 2D image; and a three-dimensional (3D) camera that includes a light source and generates a depth image based on reflected light of light emitted by the light source, the image sensing method comprising:

performing recognition on a subject included in the 2D image, using at least one of the 2D image or the depth image; and controlling on and off of an operation of the 3D camera, wherein in the controlling, the operation of the 3D camera is turned on based on a result of the recognition using the 2D image, when the 3D camera is in a standby state in which the 3D camera has completed an initialization process after activation and the light source is not emitting light, the 3D camera enters the standby state when the operation of the 3D camera is turned off in the controlling after being turned on in the controlling, the image sensing method further comprises:

controlling an output of the 2D image, based on a result of the recognition using the at least one of the 2D image or the depth image; and controlling an output of the depth image, based on the result of the recognition using the at least one of the 2D image or the depth image, and when a result of the recognition using the 2D image and the depth image indicates that a predetermined object is included within a predetermined distance range:

the controlling of the output of the 2D image includes outputting a 2D image of a portion including the predetermined object in the 2D image; and the controlling of the output of the depth image includes outputting a depth image of the portion including the predetermined object in the 2D image.

14. An image sensing method performed by an image sensing device, the image sensing device including:

a two-dimensional (2D) camera that generates a 2D image; and a three-dimensional (3D) camera that includes a light source and generates a depth image based on reflected light of light emitted by the light source, the image sensing method comprising:

performing recognition on a subject included in the 2D image, using at least one of the 2D image or the depth image; and controlling on and off of an operation of the 3D camera, wherein in the controlling, the operation of the 3D camera is turned on based on a result of the recognition using the 2D image, when the 3D camera is in a standby state in which the 3D camera has completed an initialization process after activation and the light source is not emitting light, the 3D camera enters the standby state when the operation of the 3D camera is turned off in the controlling after being turned on in the controlling, and the image sensing method further comprises:

controlling a focus of the 2D camera based on depth information that is indicated by the depth image and indicates a depth to the subject included in the 2D image.

15. An image sensing method performed by an image sensing device, the image sensing device including:

a two-dimensional (2D) camera that generates a 2D image; and a three-dimensional (3D) camera that includes a light source and generates a depth image based on reflected light of light emitted by the light source, the image sensing method comprising:

performing recognition on a subject included in the 2D image, using at least one of the 2D image or the depth image; and controlling on and off of an operation of the 3D camera, wherein in the controlling, the operation of the 3D camera is turned on based on a result of the recognition using the 2D image, when the 3D camera is in a standby state in which the 3D camera has completed an initialization process after activation and the light source is not emitting light, the 3D camera enters the standby state when the operation of the 3D camera is turned off in the controlling after being turned on in the controlling, the image sensing device includes a plurality of 3D cameras each being the 3D camera, and the controlling includes, when the plurality of 3D cameras are in the standby state, selecting at least one of the plurality of 3D cameras based on a position of the subject included in the 2D image, and turning on an operation of the at least one of the plurality of 3D cameras selected, based on the result of the recognition using the 2D image.

* * * * *